Dec. 22, 1964
W. C. REDMAN
3,162,577
REACTOR CONTROL WITH THORIUM CONTROL GRID
Filed Nov. 6, 1963
2 Sheets-Sheet 1
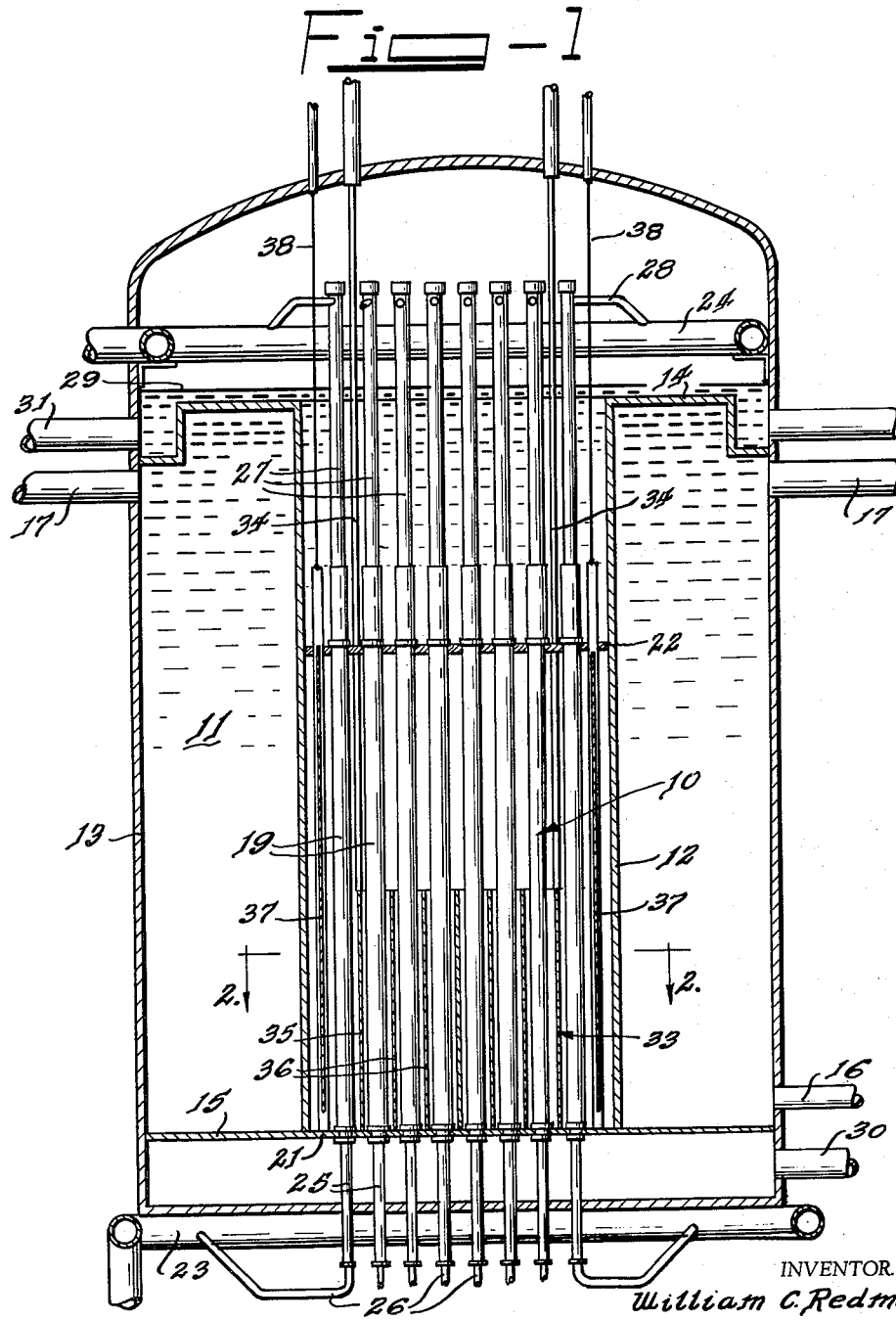
INVENTOR.
William C. Redman
BY
Attorney Dec. 22, 1964   W. C. REDMAN   3,162,577
REACTOR CONTROL WITH THORIUM CONTROL GRID
Filed Nov. 6, 1963   2 Sheets-Sheet 2
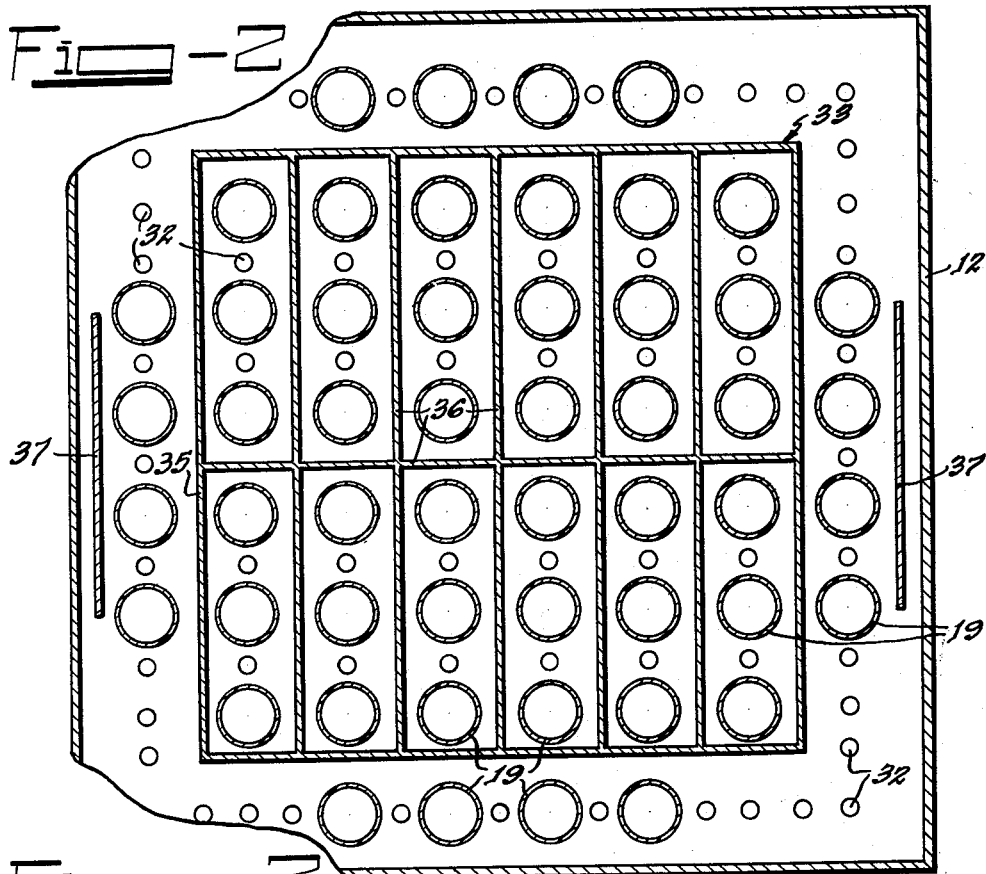
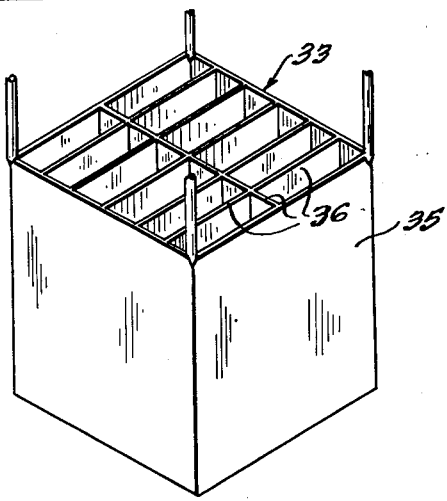
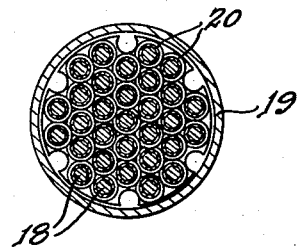
INVENTOR.
William C. Redman
BY
Attorney

United States Patent Office 3,162,577
Patented Dec. 22, 1964

3,162,577
REACTOR CONTROL WITH THORIUM
CONTROL GRID
William C. Redman, Hinsdale, Ill., assignor to the United
States of America as represented by the United States
Atomic Energy Commission
Filed Nov. 6, 1963, Ser. No. 321,984
4 Claims. (Cl. 176—21)

This invention relates to a nuclear reactor and particularly to a urania-thoria power reactor wherein heavy water serves as moderator. The invention also relates to novel means for controlling such a reactor to enhance the neutron economy and extend the useful life of the reactor. The invention further relates to a method of operating such a reactor.

Power reactors are always constructed with an appreciable excess reactivity to extend the lifetime of the reactor. It is customary to use burnable poisons or shim control rods to compensate for this initial excess reactivity. As the fuel in the reactor burns out, the burnable poison burns out and/or the shim rods are withdrawn to increase the available reactivity. Both of these expedients succeed in extending the reactivity lifetime of a reactor but both adversely affect the neutron economy in the reactor due to nonproductive loss of neutrons in the burnable poison and the shim rods.

The thoria-urania system is very attractive for power reactors because of the abundance of thoria, the high burnup potentially attainable in a thoria-urania reactor, and the compatibility of thoria and urania with high-temperature water. Similarly, heavy water is attractive as a moderator in a thoria-urania reactor because of the good neutron economy attainable therewith. Unfortunately, above a power level of a few megawatts per kilogram of fissionable material, neutron economy is impaired significantly by the large capture cross section of 27-day $Pa^{233}$ which is an intermediate product in the transmutation of $Th^{232}$ to $U^{233}$ as shown by the following nuclear equations:

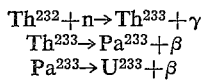

$$Th^{232}+n \rightarrow Th^{233}+\gamma$$
$$Th^{233} \rightarrow Pa^{233}+\beta$$
$$Pa^{233} \rightarrow U^{233}+\beta$$

It is accordingly an object of the present invention to develop a nuclear reactor having improved neutron economy and increased core lifetime.

It is a more detailed object of the present invention to mitigate the effect of $Pa^{233}$ on the neutron economy of a urania-thoria reactor.

It is also an object of the present invention to develop a method of operating a urania-thoria reactor to obtain an increased lifetime.

These and other objects of the present invention are attained in a urania-thoria reactor which is approximately twice the height required by nuclear design considerations and which includes a movable control grid of thorium slightly greater than one-half the height of the reactor. The control grid is employed for ordinary control of the reactor, thereby enhancing the neutron economy of the reactor since a useful product is formed in the control grid. The control grid also makes it possible to mitigate the effect of $Pa^{233}$ on the neutron economy of the reactor. By shifting the reactive part of the reactor from the top half of the reactor to the bottom half of the reactor or vice versa every 27 days with the control grid, half of the $Pa^{233}$ decays of $U^{233}$ before the portion of the reactor in which it is present again becomes chain reactive.

The invention will next be described in connection with the accompanying drawings wherein FIG. 1 is a diagrammatic cross-section of a nuclear reactor illustrating the present invention, FIG. 2 is a horizontal cross-section thereof taken on the line 2—2, FIG. 3 is a perspective view of a control grid which is of primary importance to the present invention, and FIG. 4 is a horizontal cross-section of a typical fuel element.

As shown in the drawing, the reactor comprises a core 10 and a reflector 11 surrounding the core. Core 10 and reflector 11 are separated by an inner shell 12 while an outer shell 13 encloses the entire reactor. Reflector 11 extends the full length of the core between an upper plate 14 at the top of inner shell 12 and a lower plate 15 at the bottom of inner shell 12 and light water is introduced thereinto through inlet 16 and withdrawn through outlet 17.

Core 10 is composed of bundles of parallel fuel rods 18 (see FIG. 4) disposed in a plurality of vertical pressure tubes 19. Spiral wires 20 on the fuel rods 18 assure that the fuel rods are properly spaced. Fuel rods 18 are supported by clamps (not shown) at the top and bottom of the pressure tubes 19.

Pressure tubes 19 extend between a lower support grid 21 disposed at the bottom of inner shell 12 and an upper guide grid 22 disposed intermediate of inner shell 12 and above the top of core 10. An annular inlet header 23 is disposed below the core while an annular outlet header 24 is disposed above the core. Lower pressure tube extensions 25 and inlet ducts 26 provide communication between inlet header 23 and pressure tubes 19 while upper pressure tube extensions 27 and outlet ducts 28 provide communication between outlet header 24 and pressure tubes 19.

Fuel rods 18 consist of fired pellets of a uniform mixture of highly enriched urania and thoria in a tube formed of a corrosion-resistant material of low neutron capture cross-section such as Zircaloy-II.

The primary coolant flow through the reactor passes through pressure tubes 19. Heavy water under pressure enters pressure tubes 19 from ducts 26 and header 23 and is there heated by fuel rods 18. The heated heavy water is withdrawn through outlet ducts 28 and outlet header 24 to produce power exterior to the reactor.

Inner shell 12 contains a body of heavy water 29 which serves as moderator and secondary coolant. A continuous flow of heavy water is maintained by introducing heavy water into reactor vessel 13 below the core through moderator inlet 30 and withdrawing it from reactor vessel 13 above the core through moderator outlet 31. The heavy water passes into and out of inner shell 12 through perforations 32 (see FIG. 2) in support grid 21 and guide grid 22.

Primary control of the reactor is obtained by means of a control grid 33 of thorium which is raised and lowered by means of cables 34. As shown in FIG. 3, control grid 33 comprises an outer box 35 which is open at both ends and intersecting sheets 36 of thorium in the box 35. The sheets of thorium are spaced far enough apart to clear pressure tubes 19 so that the control grid 33 interpenetrates the reactor core 10. The thorium employed to form control grid 33 is, of course, clad in a corrosion-resistant material such as Zircaloy-II. In addition to control grid 33, control plates 37 operated by cables 38 are provided for safety control.

The primary point of novelty according to the present invention resides in the use of a control grid 33 of slightly greater than one-half the height of the core in a reactor core which is twice the height required by design considerations for criticality. Thus only half of the core is required for operation of the reactor. The thorium grid is placed so as to prevent a chain reaction in either the top half or the bottom half of the reactor and the other half of the reactor is used to produce power. To shut down the reactor, the control grid is placed in the center of the core and safety plates 37 are inserted into the reactor.

As pointed out heretofore, the large capture cross-section of $Pa^{233}$ which is an intermediate product in the transmutation of $Th^{232}$ to $U^{233}$ impairs neutron economy significantly in a power reactor. Control grid 33 affords a convenient means of reducing this neutron loss. Since $Pa^{233}$ has a half-life of 27 days, the amount present will be reduced significantly by allowing a reactor to sit for 27 days after operation. Thus the control grid may be placed at the top of the reactor for 27 days while power is obtained from the bottom half of the reactor. The control grid is then moved to the bottom half of the reactor for 27 days to permit power to be obtained from the top half. While the bottom half is shut down, half of the $Pa^{233}$ present decays to form $U^{233}$ so that when the control grid is moved again the amount of $Pa^{233}$ present is significantly reduced.

Using the herein-described fuel, the amount of fuel necessary to obtain criticality under various conditions is described in report ANL–6378 dated December 1961. According to the present invention the height of the core will be approximately twice that described and the number of fuel elements will be sufficient to obtain the desired power.

It will be understood that the invention is not to be limited to the details given herein but that it may be modified within the scope of the appended claims.

The embodiments of the invention in which an exclusive property or privilege is claimed are defined as follows:

1. A nuclear reactor comprising a core consisting of a plurality of vertically disposed clusters of fuel elements immersed in heavy water, said fuel elements being composed of a major proportion of thoria and a minor proportion of enriched urania and said core being of approximately twice the height required for criticality, and a control grid of thorium of slightly greater than one-half the height of the reactor core mounted for vertical movement within the core.

2. A nuclear reactor comprising a core, a light-water reflector surrounding the core, a control grid of thorium mounted for vertical movement within the core, and a pair of safety rods mounted for rapid insertion into the core, said core comprising a plurality of vertically disposed clusters of fuel elements composed of a major proportion of thoria and a minor proportion of enriched urania disposed within vertically disposed pressure tubes, means for passing heavy water under pressure through the pressure tubes, and a mass of heavy water surrounding the pressure tubes, characterized by said core being approximately twice the height required for criticality and said control grid being slightly greater than one-half the height of the core.

3. A method of operating a urania-thoria, heavy-water power reactor which is approximately twice the height required for criticality comprising adjusting a thorium control grid so that one-half of the reactor is critical while the other half is not critical, operating the reactor for approximately 27 days, moving the thorium control grid to shut down the originally critical half of the reactor and make the other critical, again operating for 27 days, and repeating the procedure as long as criticality is attained.

4. In a heavy-water, urania-thoria power reactor incorporating a control grid of thorium, the improvement comprising the reactor core being of twice the height required for criticality and the control grid of thorium being slightly greater than half the height of the reactor core.

References Cited by the Examiner
UNITED STATES PATENTS 2,840,522  6/58  Young et al. _____ 176—21

FOREIGN PATENTS 657,633  2/63  Canada.

OTHER REFERENCES

ANL–6378, publ. by AEC, p. 13, December 1961.

CARL D. QUARFORTH, *Primary Examiner.*